United States Patent [19]

Wakefield

[11] 4,025,092
[45] May 24, 1977

[54] SELF-ALIGNING DETACHABLE FITTING

[75] Inventor: Fancher B. Wakefield, E. Northport, N.Y.

[73] Assignee: Grumman Aerospace Corporation, Bethpage, N.Y.

[22] Filed: Dec. 2, 1974

[21] Appl. No.: 528,699

Related U.S. Application Data

[63] Continuation-in-part of Ser. No. 389,504, Aug. 20, 1973, abandoned.

[52] U.S. Cl. .............................. 285/94; 285/334.4; 285/332.1
[51] Int. Cl.² .......................................... F16L 7/00
[58] Field of Search ............. 285/261, 263, 332.1, 285/354, 334.1, 386, 334.4, 94, DIG. 18, 110

[56] References Cited

UNITED STATES PATENTS

| | | | |
|---|---|---|---|
| 1,398,985 | 12/1921 | Wadley | 285/334.4 X |
| 2,295,716 | 9/1942 | Cox | 285/332.1 X |
| 2,302,617 | 11/1942 | Little | 285/334.4 X |
| 3,142,498 | 7/1960 | Press | 285/DIG. 18 |
| 3,218,096 | 11/1965 | Press | 285/332.1 |
| 3,264,012 | 8/1966 | Giovanazzi et al. | 285/334.4 X |
| 3,596,933 | 8/1971 | Luckenbill | 285/94 |

FOREIGN PATENTS OR APPLICATIONS 274,138   7/1927   United Kingdom .............. 285/158

*Primary Examiner*—Dave W. Arola
*Attorney, Agent, or Firm*—Morgan, Finnegan, Pine, Foley & Lee

[57] ABSTRACT

A seat element is attached by mechanically swaging, welding, or brazing to one section of tubing and comprises a radially extending cylindrical flange with exterior and interior spherical mating surfaces. A sleeve element is placed over the seat element for axial movement thereon, and is provided with an interior spherical surface for engagement with the exterior spherical surface of the seat element. An externally threaded union secured to another section of tubing or component boss is provided with a thin flexible flange which may be conical or spherically concave for engagement with the interior spherical surface of the seat element in a stressed relation when engaged by the sleeve element.

5 Claims, 4 Drawing Figures

SELF-ALIGNING DETACHABLE FITTING

CROSS REFERENCE TO RELATED APPLICATION

This application is a continuation-in-part of my co-pending application Ser. No. 389,504 filed Aug. 20, 1973, now abandoned.

BACKGROUND OF THE INVENTION

The integrity of fluid transmission systems in aircraft is critical to the safety of the aircraft and a great amount of effort has been expended in the developement of such systems which are substantially failsafe. Because of the spatial limitations present in aircraft and the need for carryin fluids to all areas of the plane, the fluid systems therein necessarily comprise an intricate web of tubing, valves and couplings. One of the weak aspects of these systems is the couplings to the overall tubing system. The most critical problems with respect to these couplings result from the limited space available in which to install these assemblies.

Well known couplings can be adapted for use in these high pressure systems, however, they generally suffer a serious drawback in that they require axial alignment of the tubing before a secure connection can be achieved. Axial alignment is extremely difficult to accomplish under the installation conditions present in aircraft and invariably will result in a union which is prestressed, inhibiting an effective seal as well as inducing undesirable stresses in the transmission line itself. As the aircraft vibrates during normal operation, the tubing is subjected to further stressing. The additive effect of these two stresses may reach or exceed the allowable maximum which may either cause immediate failure or significantly shorten the useful life due to its prematurely fatiguing.

It is therefore a primary object of the coupling of this invention to eliminate the need for accurate axial alignment of the tubular members to be connected and to provide a coupling which is pre-stressed in a manner which enhances the effective seal of the connection.

More specifically, it is an object of this invention to provide a lightweight, high pressure, high temperature coupling having a very thin flange in stressed mating relation with a spherical seat element.

Attempts to overcome the above mentioned problems are represented by the coupling devices described in U.S. Pat. No. 3,067,187 to Collins and 3,273,917 to Chakroff. These devices utilize spherical sealing surfaces which, however, result only in a single line sealing contact and a very limited ability to accommodate misalignment.

SUMMARY OF INVENTION

The coupling of this invention is provided by a spherical sealing surface in contact with either a corresponding spherical or conical flange. Since these surfaces are substantially concentric, the elements need not be axially aligned in order to effect a securely sealed connection. Assuming a connection is desired between two sections of tubing, the device comprises a flanged seat element forming spherical sealing surfaces on one section of tubing, an interiorly threaded sleeve element which fits over the seat element to engage one of the sealing surfaces of the seat element, and a threaded union formed with a thin flexible flange at one end which may be spherical or conical. The union is engaged into the threads of the sleeve element, and is tightened until the flexible flange portion engages the spherical sealing surface of the seat element in a stressed relation. The mating surfaces between the seat and sleeve elements are essentially spherical as are the engaging surfaces of the seat element and union. The main sealing contact is provided between the flexible flange of the union and the interior spherical surface of the flanged seat element.

The present invention is especially useful at a multiple fitting junction where considerable misalignments are a virtual certainty. Furthermore, since the flexible flange is formed on the union, repair or replacement is conveniently accomplished as only the union need be removed, avoiding necessity of stripping away of tubing itself.

DESCRIPTION OF THE DRAWING

These and other features, objects and advantages of the present invention will become more apparent when the detailed description is considered in light of the drawing in which.

DETAILED DESCRIPTION OF THE INVENTION

Figure 1:
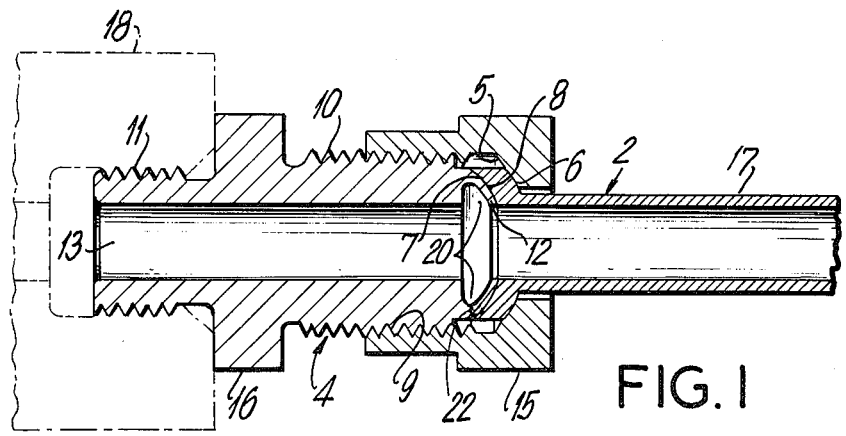
FIG. 1 is a cross sectional view of the coupling and connecting passages according to both aspects of the invention.

Referring now to FIG. 1, the coupling 1 of the subject invention is comprised of three basic elements, namely a seat element 2, a sleeve element 3, and a union 4. It is used to connect tube section 17 to another tube section or components which are removably secured to threads 11 on union 4, as for example by boss 18.

Figure 2:
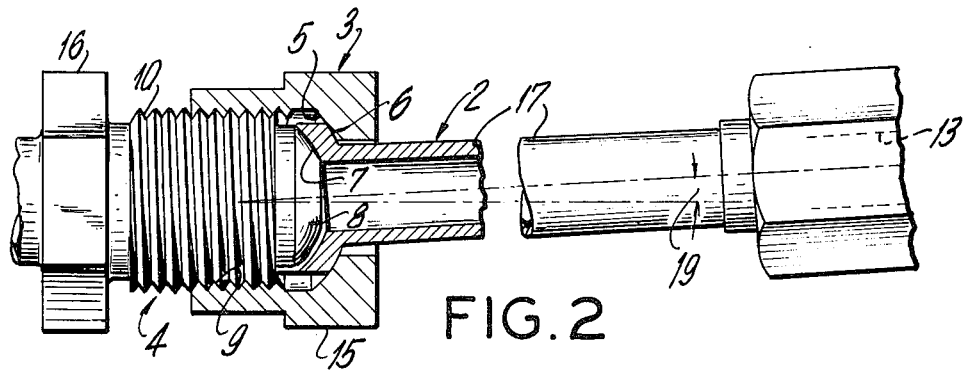
FIG. 2 is a partial cross sectional view of the coupling showing the union member engaging surface in full.
Figure 3A:
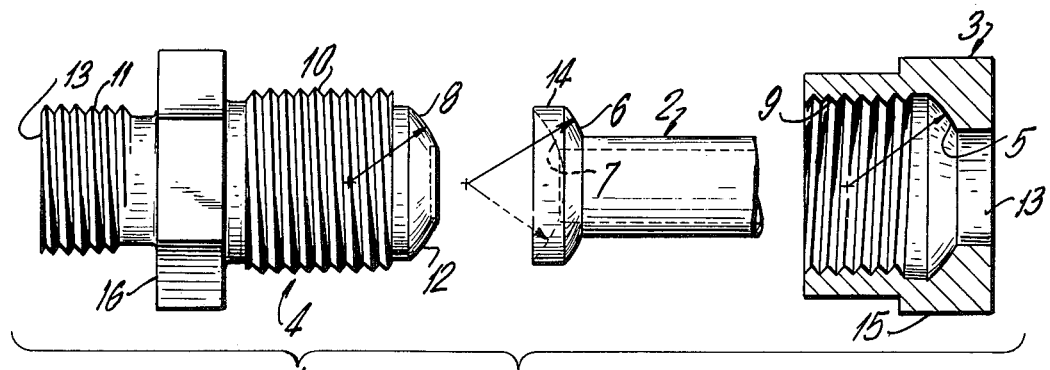
FIG. 3a is an exploded view of the elements of the coupling with the sleeve element in cross section.

According to one aspect of the present invention shown in FIG. 3a, each of the above mentioned elements have mating or sealing surfaces which are in a spherical configuration, namely, surface 5 on sleeve element 3, surfaces 6 and 7 on seat element 2 and surface 8 on union 4. These surfaces engage as shown in FIGS. 1 and 2 to form a connection which need not be axially aligned.

Seat element 2 is joined to tube 17 by mechanically swaging, brazing or butt welding and is tubular itself to provide an unobstructed continuation of fluid passage 13. A cylindrical flange 14 extends radial outward from element 2 and is constructed having convex spherical mating surface 6 and concave spherical sealing surface 7. The surfaces 6 and 7 are substantially concentric.

Sleeve element 3 is placed over seat element 2 for axial sliding movement thereon, said motion being limited by engagement between an interior spherical surface 5 of sleeve 3 and the spherical surface 6 of flange 14. A portion of the interior surface of sleeve element 3 is provided with threads 9. In addition the outer surface 15 of the sleeve 3 may be constructed in the form of a nut for convenient tightening with a wrench or other tool.

Union 4 is constructed having a generally tubular shape in order to provide an unobstructed continuation of fluid passage 13. At one end, there is formed a flexible flange member 12 having, according to this aspect of the subject invention, a substantially spherical outer sealing surface 8 which engages sealing surface 7 on seat element 2. Flexible flange 12 is formed by machining indentation 20 deeply into the inner wall of union 4 substantially close to surface 8 such that the thickness of lip 12 is appreciable thinner than butt 22 remaining at the deepest point of indentation 20. Union 4 is provided with exterior threads 10 for engagement with threads 9 of sleeve 3. A radially outward extension 16 may be provided in the shape of a nut so as to accommodte a tool for tightening or loosening purposes. Threads 11 of union 4 are adaptable for connection with a wide variety of passages for valves, larger tubes, and the like. Alternatively, the end of union 4 may be constructed such that it may be joined by swaging, brazing or butt welding (not shown) to a tube section in an arrangement similar to the joining of tube 17 to seat element 2 of the coupling.

In operation, seat element 2 is mechanically swaged, brazed or welded onto tube 17 with sleeve member 3 slidably mounted thereon. Sleeve 3 is then screwed over union 4 until spherical surface 8 of the flexible flange 12 contacts sealing surface 7 of flange 14. As the union 4 and sleeve 3 are further tightened, flexible flange 12 deforms to conform to the spherical contour of surface 7, thereby placing the coupling assembly in a stressed condition. Accordingly, the coupling can accommodate misalignment in any direction as much as 3° without inducing any stress in the transmission line.

Figure 3B:
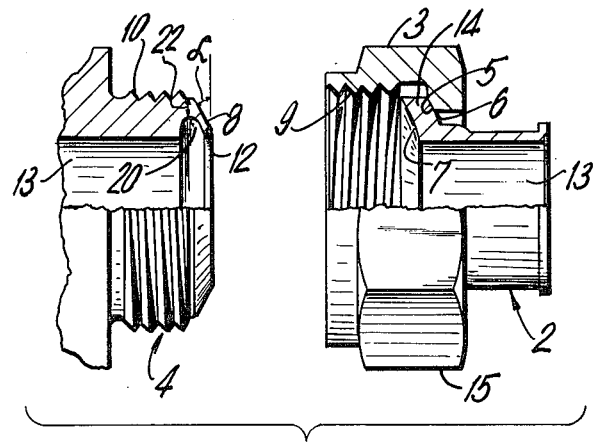
FIG. 3b is an exploded partial cross sectional view of the coupling wherein the union is formed with a conical sealing surface.

In a particularly useful embodiment, outer surface 8 on union 4 is formed in a conical configuration as shown in FIG. 3b. Indentation 20 is cut substantially deep into the inside surface of the union substantially close to outer surface 8, leaving flexible lip or beam 12 which is appreciably thinner than the remaining butt 22. Butt 22 must be thick enough to accommodate the anticipated axial load, shear stresses, bending moments and torque. The lengths of surface 8 and lip 12 are fabricated such that the entire inside diameter at the beam is always in contact with corresponding mating surface 7 on the seat element at the angle, 19, of greatest axial misalignment. According to this aspect of the present invention, it is preferred that conical lip 12 of union 4 is formed such that angle $\alpha$ between surface 8 and the normal to the longitudinal axis of the union is from about 26.5° to about 28° for tube members having an inside diameter of about ½ inch or greater and from about 30° to about 35° for sizes of less than ½ inch.

In operation, seat element 2 is mechanically swaged, brazed or welded onto tube section 17 with sleeve element 3 slidably mounted thereon. Union 4 may be similarly joined to another tube section or other components or adapted for connection thereto as by boss 18. Conical lip 12 of union 4 is brought in approximate mating relation with flange 14 of seat element 2 and sleeve element 3 is screwed over the threads of union 4. As sleeve element 3 is tightened on union 4, flexible lip 12 deforms to conform to the spherical contour of surface 7, placing the coupling in a stressed condition as shown in FIG. 1. Accordingly, the coupling can accommodate misalignment in any direction as much as 3° without inducing any stress in the transmission line as shown in FIG. 2. This is especially useful when used with a multiple junction fitting.

It is preferred in both aspects of the present invention that all the mating and sealing surfaces are coated with a dry film lubricant such as a molydisulfide. The lubricant can be applied to sealing surfaces 7 and to mating surfaces 5 and/or 6. The coating of lubricant is particularly useful in that it reduces the amount of torque transmitted to the seat element and along the tube section 17 to avoid further any stressing in the tubing due to the turning and tightening during installation. Furthermore, it functions at an anti-fretting and an anti-galling agent which is particularly useful for titanium components. Advantageously the threaded portion 9 of sleeve 3 is also coated with the lubricant to substantially prevent the transmission of torque to the tubing caused by frictional resistance to tightening operation from within the threads.

The stressing of the coupling is particularly advantageous in that stressed flange 12 acts to enhance the seal between the seat element and the union. Furthermore, the seal will be bolstered by any increase in pressure within passage 13 as the pressure will urge flexible flange 12 outwardly into surface 7 of the seat element. The stressing also effectively broadens the operable temperature and pressure range of the coupling since the prestressed flange will accommodate any relaxation in the fitting attributable to such factors as increased temperature or decreased pressure. In addition, the mutual cooperation of surfaces 5, 6, 7, and 8 provides a securely sealed connection which need not have the axis of its passages accurately aligned. Indeed a misalignment of over 3 degrees, as illustrated in FIG. 2 at angle 19, can be tolerated and an even greater misalignment capability can be achieved by suitable machining of sleeve 3 and flanges 12 and 14.

The coupling should be constructed of materials suitable for high temperature and pressure environment such as 6 AL/4V titanium or 17-4 PH stainless steel. It is particularly useful if the seat element is made of the same material as tubing 17 to maintain structural integrity and strength. In addition, union 4 may be heat treated to give increased strength to flexible flange 12.

Those skilled in the art will recognize that modifications may be made in the detachable fitting according to the present invention without departing from the spirit of the invention as defined in the appended claims.

What is claimed is:

1. Coupling means capable of connecting two sections of a high pressure fluid-carrying conduit, which comprise:

a seat element having one end adapted to be secured to and to form a continuation of a first conduit section to be coupled, and having a flange formed on its other end, said flange having a substantially concave interior spherical sealing surface and a generally convex exterior spherical mating surface;

a union having one end adapted to be secured to and to form a continuation of a second conduit section to be coupled, and an indentation in its inner surface substantially near its other, free end, said indentation defining a flexible flange extending radially inwardly of the outer surface of said union, said flexible flange having an essentially conical sealing surface adapted to sealingly engage the interior spherical sealing surface of said seat element and to deform for substantially complementary engagement therewith; and a sleeve element having a generally concave interior spherical mating surface adapted to engage and bear against said exterior mating surface of said seat element, said sleeve element including means for tighteningly fastening said sleeve element to said union, such that when said coupling means are assembled, with said sealing surfaces of said union and said seat element in contact and said sleeve element generally tightly fastened to said union, said flexible flange is deformed to conform substantially to said spherical sealing surface of said seat element in a generally stressed condition to provide sealing engagement therewith and to accommodate axial misalignment of the conduit sections secured to said union and said element whereby the first and second conduit sections do not require axial alignment for coupling.

2. Coupling means according to claim 1 wherein said conical flange is oriented to form an angle with a normal to said union on its longitudinal axis such that said angle ranges from about 26.5° to about 28° for sections having an inside diameter of about ½ and larger and from about 30° to about 35° for sections having an inside diameter of less than ½.

3. Coupling means according to claim 2 wherein said means on said sleeve element for fastening said sleeve element to said union comprise threads formed on an internal portion thereof, and wherein said union includes threads formed on an external portion thereof adapted to be threadably engaged by the internal threaded portion of said sleeve element for tighteningly fastening said sleeve element onto said union.

4. Coupling means according to claim 3 which further comprises a dry film anti-fretting and anti-galling lubricant applied to the sealing and mating surfaces of said seat element, to the spherical surface of said sleeve element, and on said sleeve element along its interior threaded surface.

5. Coupling means 4 wherein said dry film is molydisulfide.

* * * * *

UNITED STATES PATENT AND TRADEMARK OFFICE
CERTIFICATE OF CORRECTION

PATENT NO. : 4,025,092
DATED : May 24, 1977
INVENTOR(S) : Fancher B. Wakefield

It is certified that error appears in the above–identified patent and that said Letters Patent are hereby corrected as shown below:

IN THE SPECIFICATION:

In Column 1, line 12, "develope-" should be --develop--;
In Column 1, line 15, "carryin" should be --carrying--;
In Column 1, line 18, after "couplings" insert --for connecting sections of tubing and a variety of components--;
In Column 3, line 10, "modte" should be --modate--.

IN THE CLAIMS:

In Claim 1, line 36, insert --seat-- before "element";
In Claim 2, line 5, "1/2" should be --1/2"--;
In Claim 2, line 7, "1/2" should be --1/2"--;
In Claim 5, line 1, insert --according to Claim-- before "4".

Signed and Sealed this twenty-third Day of August 1977

[SEAL]

Attest:

RUTH C. MASON
Attesting Officer

C. MARSHALL DANN
Commissioner of Patents and Trademarks